(12) United States Patent
Cheng

(10) Patent No.: US 6,577,169 B1
(45) Date of Patent: Jun. 10, 2003

(54) CLOCK SELECTION CIRCUIT FOR ELIMINATING SHORT CLOCK SIGNAL GENERATED WHEN SWITCHING CLOCK SIGNALS PRODUCED BY ONE CLOCK GENERATOR TO ANOTHER CLOCK GENERATOR

(75) Inventor: Lin Chi Cheng, Taoyuan (TW)

(73) Assignee: BenQ Corporation, Tao-Yuan Hsien (TW)

( * ) Notice: Subject to any disclaimer, the term of this patent is extended or adjusted under 35 U.S.C. 154(b) by 0 days.

(21) Appl. No.: 08/926,738

(22) Filed: Sep. 10, 1997

(51) Int. Cl.$^7$ .............................................. H03K 17/00
(52) U.S. Cl. ......................................... 327/99; 327/298
(58) Field of Search ........................... 327/99, 298, 291, 327/293, 294; 395/556; 713/501

(56) References Cited

U.S. PATENT DOCUMENTS

| | | | | |
|---|---|---|---|---|
| 5,155,380 A | * | 10/1992 | Hwang et al. ................. | 327/99 |
| 5,623,223 A | * | 4/1997 | Pasqualini ................... | 327/298 |
| 5,726,593 A | * | 3/1998 | Ruuskanen ................. | 327/298 |

* cited by examiner

Primary Examiner—Tuan T. Lam
(74) Attorney, Agent, or Firm—Winston Hsu

(57) ABSTRACT

The present invention relates to a clock selection circuit which can eliminate short clock signals when switching clock signals produced by one clock generator to clock signals produced by another clock generator. The clock selection circuit comprises a selecting circuit for selecting the clock signals generated by a first clock generator out of a plurality of clock generators of different frequencies and generating an output, each clock signal comprising two different logic levels; a first detecting circuit for detecting a predetermined logic level contained in the output of the selecting circuit after receiving a clock selection signal wherein the selecting circuit is switched to select the clock signals generated by a second clock generator according to the clock selection signal after the predetermined logic level is detected by the first detecting circuit; a holding circuit for holding the output of the selecting circuit unchanged after the predetermined logic level being detected by the first detecting circuit; and a second detecting circuit for detecting the predetermined logic level contained in the output of the selecting circuit after the output of the selecting circuit being held by the holding circuit and releasing the holding circuit to allow the output of the selecting circuit to pass through when detected.

14 Claims, 3 Drawing Sheets

CLOCK SELECTION CIRCUIT FOR ELIMINATING SHORT CLOCK SIGNAL GENERATED WHEN SWITCHING CLOCK SIGNALS PRODUCED BY ONE CLOCK GENERATOR TO ANOTHER CLOCK GENERATOR

BACKGROUND OF THE INVENTION

1. Field of the Invention

The present invention relates to a clock selection circuit for selecting one clock generator out of a plurality of clock generators of different frequencies, and more particularly, to a clock selection circuit which can eliminate short clock signals when switching clock signals produced by one clock generator to clock signals produced by another clock generator.

2. Description of the Prior Art

Clock selection circuits are frequently used in systems which require two or more clock frequencies such as CD-ROM (compact disc —read only memory) player. A CD-ROM player usually requires a high frequency clock for reading text data and a low frequency clock for reading audio signals from a CD-ROM. A clock selection circuit is required for selecting clock signals generated from the high frequency or low frequency clock.

Please refer to FIG. 1. FIG. 1 shows a prior art clock selection circuit 10 which is connected to two clock generators F1 and F2. Circuit 10 is controlled by a clock selection signal inputted from port S. Circuit 10 comprises an inverter 12 for inverting the clock selection signal inputted from port S, an AND gate 14 connected to the clock generator F1 and port S, an AND gate 16 connected to the clock generator F2 and the inverter 12, and a NOR gate 18 connected to the outputs of the AND gates 14 and 16 for producing the output clock signals Fout. The two clock generators F1 and F2 are used to generate clock signals of different frequencies, but only the clock signals of one clock generator will be selected by the clock selection circuit 10 according to the clock selection signal inputted from port S.

Please refer to FIG. 2. FIG. 2 is a timing diagram of the clock selection circuit 10 shown in FIG. 1. It shows the clock signals generated by the two clock generators F1 and F2, the clock selection signal inputted from port S, and the clock signals Fout outputted from NOR gate 18 of the clock selection circuit 10. Each clock signal comprises two logic levels: a logic high and a logic zero. And the clock frequency of the clock generator F1 is higher than the clock frequency of the clock generator F2. One problem of the prior art clock selection circuit 10 is clearly shown in the timing diagram. Before the clock selection signal 20 is received, the clock signals outputted from NOR gate 18 is generated by the clock generator F2. And after receiving the clock selection signal 20, the output of the NOR gate 18 is switched to the clock signals generated by the clock generated by the clock generator F1. The period of the clock signal 22 which is generated when the output of the NOR gate 19 is switched from clock generator F2 to F1, is much shorter than any of the clock signals generated by the clock generators F1 or F2. Such short clock signal may cause abnormal behavior of the logic circuit of a CD-ROM player since the logic circuit is designed to fit clock rates up to the clock rate of the clock generator F1. If a clock signal of much higher clock rate, such as the clock signal 22, is passed to the logic circuit, the logic circuit may not tolerate such high frequency clock signal and the result is unpredictable. It may cause failure in reading data from a CD-ROM or may cause damage to the CD-ROM player.

SUMMARY OF THE INVENTION

It is therefore a primary objective of the present invention to provide a clock selection circuit which can eliminate short clock signals when switching clock signals generated by one clock generator to the clock signals generated by another clock generator.

In a preferred embodiment, the present invention includes a clock selection circuit comprising:

selecting means for selecting the clock signals generated by a first clock generator out of a plurality of clock generators of different frequencies and generating an output, each clock signal comprising two different logic levels;

first detecting means for detecting a predetermined logic level contained in the output of the selecting means after receiving a clock selection signal wherein the selecting means is switched to select the clock signals generated by a second clock generator according to the clock selection signal after the predetermined logic level is detected by the first detecting means;

holding means for holding the output of the selecting means unchanged after the predetermined logic level being detected by the first detecting means; and second detecting means for detecting the predetermined logic level contained in the output of the selecting means after the output of the selecting means being held by the holding means and releasing the holding means to allow the output of the selecting means to pass through when detected.

The first detecting means detects the predetermined logic level contained in the output of the selecting means when a leading edge of the predetermined logic level is detected by the first detecting means. And the second detecting means detects the predetermined logic level contained in the output of the selecting means when a leading edge of the predetermined logic level is detected by the second detecting means.

It is an advantage of the present invention that the output of the clock selection circuit generated by the holding means is maintained in the predetermined logic level after the predetermined logic level generated by the first clock generator is detected by the first detecting means, and the holding means is released by the second detecting means to allow the output of the selecting means to pass through after the predetermined logic level generated by the second clock generator is detected by the second detecting means. When the clock signals generated by the first clock generator is switched by the clock selection circuit to the clock signals generated by the second clock generator, the output of the clock selection circuit will be maintained in the predetermined logic level which guarantees that the period of the clock signal generated at the switching period will never be shorter than the period of the clock signals generated by the second clock generator. In such case the above mentioned short clock signal problem is totally solved.

These and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 3:
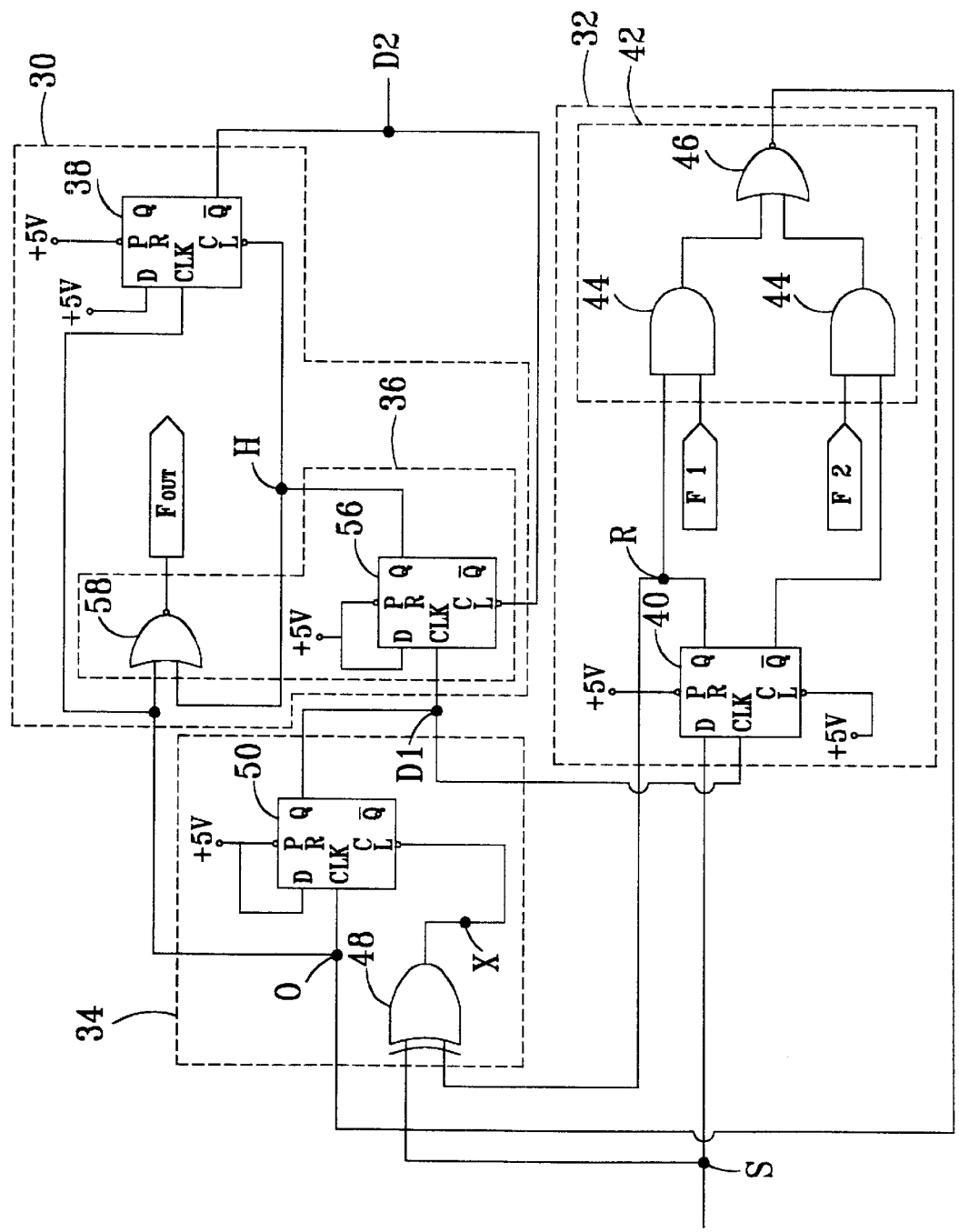
FIG. 3 shows a clock selection circuit according to the present invention.

Please refer to FIG. 3. FIG. 3 shows a clock selection circuit 30 according to the present invention. The clock selection circuit 30 comprises:

a selection circuit 32 for selecting the clock signals generated by one of the two clock generators F1 and F2 of different frequencies and generating an output over port O;

a first detecting circuit 34 for detecting a logic one contained in the output of the selection circuit 32 after receiving a clock selection signal from port S wherein the selection circuit 32 is switched to select the clock signals generated by a second clock generator according to the clock selection signal after the logic one is detected by the first detecting circuit 34;

a holding circuit 36 for holding the output of the selection circuit 32 over port $F_{out}$ unchanged after the logic one is detected by the first detecting circuit; and a second detecting circuit 38 for detecting the logic one contained in the output of the selection circuit 32 after the output of the selection circuit is held by the holding circuit 36 and releasing the holding circuit 36 to allow the output of the selection circuit 32 to pass through the holding circuit 36 when the logic one is detected by the second detecting circuit 38.

The selection circuit 32 comprises a register 40 which is a D flip-flop for storing the clock selection signal inputted from port S and a selecting circuit 42 for selecting the clock signals generated by one of the two clock generators F1 or F2 according to the clock selection signal stored in the register 40. The register 40 is controlled by the output of the first detecting circuit 34 about when to store the clock selection signal received from port S. The selecting circuit 42 comprises two AND gates 44 which are controlled by the outputs of the register 40 and one NOR gate 46 for collecting outputs generated by the AND gates 44 and producing an output for the selection circuit 32 over port O. In the preferred embodiment of the present invention, only two clock generators F1 and F2 are presented in FIG. 3. Both the AND gates 44 contained in the selecting circuit 42 and the number of D flip-flops contained in the register 40 can be added to control outputs of more clock generators.

The first detecting circuit 34 comprises an XOR gate 48 which is connected to the port S and the output port R of the register 40, and one flip-flop 50 which is connected to the output port X of the XOR gate 48 and the output port 0 of the selection circuit 32. The XOR gate 48 is used to detect whether a new clock selection signal is presented at port S. If a new clock selection signal presented at port S is different from the clock selection signal originally stored in the register 40, the XOR gate 48 will detect such situation and generates a logic one over its output port X. The flip-flop 50 is used for detecting a logic one from the output of the selection circuit 42 at port O when the XOR gate 48 detects a new clock selection signal at port S and generate a logic one at its output port X. The output port O is connected to the CLK (clock) port of the flip-flop 50 of the first detecting circuit 34. The first detecting circuit 34 will detect a logic one contained in the output of the selection circuit 32 when a leading edge of the logic one is presented at the CLK port of the flip-flop 50.

After the flip-flop 50 detects a logic one contained in the output of the selection circuit 42 at port O when the XOR gate 48 detects a new clock selection signal at port S, it generates a logic one at its output port D1. This output will be used to control the register 40 of the selection circuit 32 and the flip-flop 56 of the holding circuit 36.

The logic one presented at the output port D1 of the first detecting circuit 34 will trigger the register 40 of the selection circuit 32 to store the new clock selection signal received from port S. After the new clock selection signal is stored into the register 40, the outputs of the register 40 are changed and the selecting circuit 42 will then be switched to select another clock generator according to the outputs of the register 40. In the same time, the output of the register 40 at port R will become the same as the new clock selection signal presented in the port S after the new clock selection signal is stored into the register 40. This situation will be detected by the XOR gate 48 of the first detecting circuit 34 and generates a logic zero at its output port X, and this logic zero output will reset the flip-flop 50 of the first detecting circuit 34. The outputs of the XOR gate 48 and the flip-flop 50 will not be changed until another new clock selection signal is presented at port S.

The holding circuit 36 comprises a flip-flop 56 and a NOR gate 58. The flip-flop 56 is controlled by both the output of the first detecting circuit 34 at port D1 and the output of the second detecting circuit 38 at port D2 which is normally set to logic one. The flip-flop 56 will be set to a logic one when the first detecting circuit 34 detects a logic one contained in the output of the selection circuit 32 when a new clock selection signal is presented at port S. The NOR gate 58 is connected to the output of the flip-flop 56 and the output of the selection circuit 32. The NOR gate 58 generates an output Fout which is the output of the clock selection circuit 30. When the flip-flop 56 of the holding circuit 36 is set to a logic one, the output of the flip-flop 56 will hold the output Fout of the clock selection circuit 30 unchanged until the second detecting circuit 38 detects a logic one presented in the output of the selection circuit 32 at port O. Such holding will prevent the generation of a short clock signal, such as the signal 22 shown in FIG. 2, over the output port Fout.

The second detecting circuit 38 is a flip-flop 38 which is controlled by the output of the flip-flop 56 of the holding circuit 36 and the output of the selection circuit 32. When the flip-flop 56 of the holding circuit 36 is set to a logic one which means it is holding the output Fout of the clock selection circuit 30, the second detecting circuit 38 is activated by the output of the flip-flop 56 at port H and will be set to a logic one when the leading edge of a logic one presents in the output of the selection circuit 32 at port O. After a logic one is presented in the output port O of the selection circuit 32, the flip-flop 38 will be set to a logic one and its output over port D2 will be changed to a logic zero. And this logic zero will set off the flip-flop 56 of the holding circuit 36 to prevent it from holding the output of the clock selection circuit 30 at port Fout and the output of the flip-flop 56 at port H will become a logic zero. This logic zero will allow all the following clock signals presented at the output port O of the selection circuit 32 pass though the NOR gate 58 of the holding circuit 36.

Figure 4:
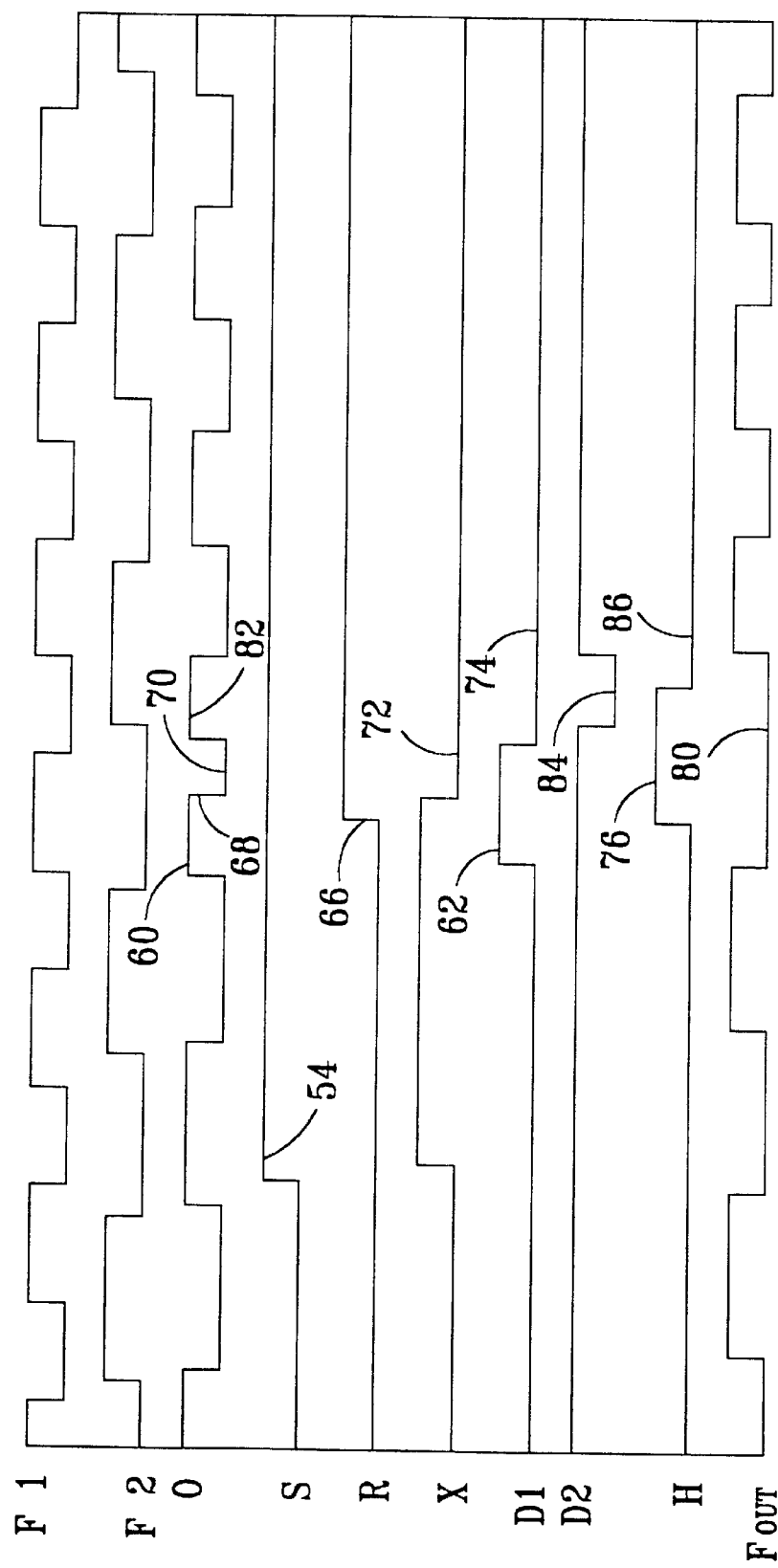
FIG. 4 shows the timing diagram of the clock selection circuit shown in FIG. 3.

Please refer to FIG. 4. FIG. 4 shows the timing diagram of the clock selection circuit 30 shown in FIG. 3. FIG. 4 shows various signals presented in various locations of the clock selection circuit 30. It shows the clock signals generated by two clock generators F1 and F2, the new clock selection signal 54 received at port S, the output of the register 40 at port R, the output of the selection circuit 32 at port O, the output of the first detecting circuit 34 at port D1, the output of a flip-flop 56 of the holding circuit 36 at port H, and the output of the second detecting circuit 38 at port D2, and the output of the clock selection circuit 30 at port Fout. The period of each clock signal generated by the clock generator F1 is shorter than the period of each clock signal generated by the clock generator F2. And each clock signal comprises a logic one level and a logic zero level.

At beginning the content of the register 40 shown in port R is a logic zero, and the clock signals generated by the clock generator F2 is selected by the selecting circuit 42. The clock signals of the clock generator F2 then passes through the NOR gate 58 of the holding circuit 36 and presented at port Fout of the clock selection circuit 30. When the new clock selection signal 54 is presented at port S, the output of the XOR gate 48 of the first detecting circuit 34 at port X will become a logic one, and this will activate the flip-flop 50 of the first detecting circuit 34. The flip-flop 50 will be set to a logic one when the leading edge of a logic one 60 is presented in the output of the selection circuit 32 at port O. After the logic one 60 is detected, the flip-flop 50 is set to a logic one and a logic one 62 is presented at the output port D1, of the flip-flop 50.

The logic one 62 presented at the output port D1, of the first detecting circuit 34 will activate the register 40 to store the new clock selection signal 54 and a logic one 66 is presented at the output port R of the register 40 when the new clock selection signal 54 is stored into the register 40. The outputs of the register 40 will switch the selecting circuit 42 to select the clock signals generated by the clock generator F1 and the output of the selecting circuit 42 at port O is changed at point 68 of FIG. 4. A short clock signal 70 is immediately generated at port O of the selecting circuit 42.

After the new clock selection signal 54 is stored into the register 40, the output of the register 40 at port R, i.e. the logic one 66, is the same as the new clock selection signal 54, and this situation will change the output of the XOR gate 48 of the first detecting circuit 34 to a logic zero 72, and this logic zero 72 will set the flip-flop 50 of the first detecting circuit 34 off. And the output of the flip-flop 50 at port D1, will immediately become a logic zero 74.

The logic one 62 presented at the output port D1, of the first detecting circuit 34 will also set flip-flop 56 of the holding circuit 36 and its output at port H to a logic one 76. The logic one 76 outputted from the flip-flop 56 will pass through the NOR gate 58 and hold the output signal 80 of the clock selection circuit 30 generated at this period unchanged until another logic one 82 is detected by the second detecting circuit 38. The short clock signal 70 generated from the selection circuit 32 at this period is thus blocked out by the output signal 76 of the holding circuit 36.

The logic one 76 presented at the output port H of the flip-flop 56 will also activate the second detecting circuit 38 which is a flip-flop, to detect a logic one presented in the output of the selection circuit 32 at port O. When the leading edge of the logic one 82 is detected by the second detecting circuit 38, its content will be set to a logic one and a logic zero 84 is presented at the output port D2 of the flip-flop 38. The logic zero 84 of the second detecting circuit 38 will set off the flip-flop 56 of the holding circuit 36 and a logic zero 86 is presented at the output port H of the flip-flop 56. After the flip-flop 56 is set off, the logic one 82 detected at the output port O of the selection circuit 32 and all its following clock signals will pass through the NOR gate 58 of the holding circuit 36.

Figure 1:
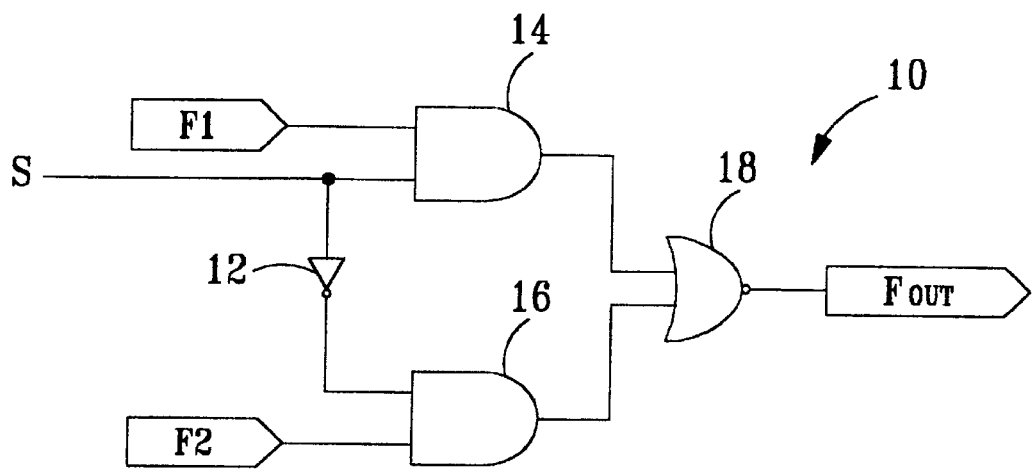
FIG. 1 shows a prior art clock selection circuit.
Figure 2:
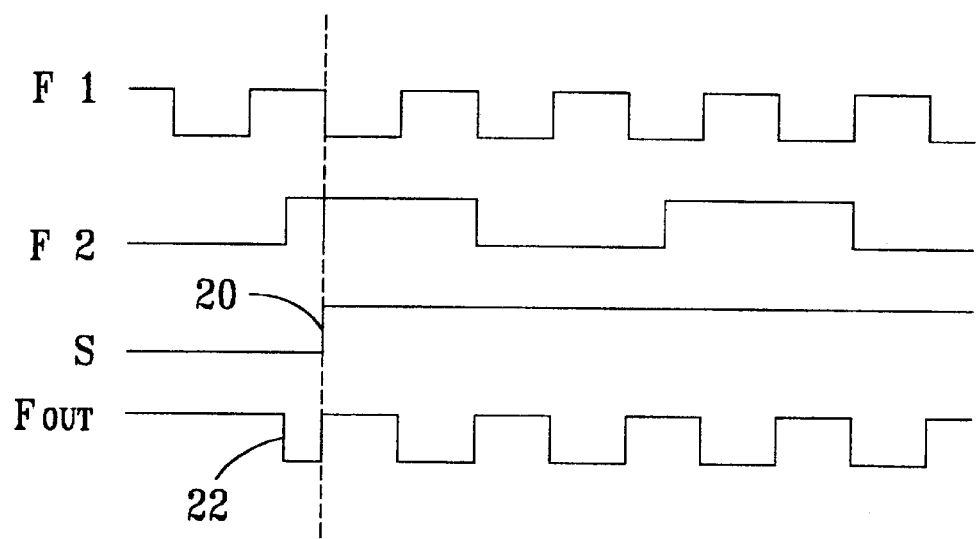
FIG. 2 shows the timing diagram of the clock selection circuit shown in FIG. 1.

From the output signals presented at port Fout of FIG. 4, it can be seen that the logic zero 80 outputted during the clock switching period from the logic one 60 to the logic one 82 at port O is held unchanged because the short clock signal 70 generated at this period is blocked out by the logic one 76 generated by the holding circuit 36 by using the NOR gate 58. The problem caused by the short clock signal 22 shown in FIG. 2 is thus totally eliminated in the clock selection circuit 30 of the present invention.

Those skilled in the art will readily observe that numerous modifications and alternations of the device may be made while retaining the teachings of the invention. Accordingly, the above disclosure should be constructed as limited only by the metes and bounds of the appended claims.

What is claimed is:

1. A clock selection circuit comprising:

selecting means for selectively outputting one of a first clock signal or a second clock signal, each clock signal comprising two different logic levels, the selecting means comprising a register for storing a clock selection signal and a selecting circuit for selecting as output one of the first clock signal or the second clock signal according to the clock selection signal stored in the register;

first detecting means for detecting a predetermined logic level contained in the output of the selecting means after receiving the clock selection signal, wherein the selecting means is switched to select a clock signal according to the clock selection signal after the predetermined logic level is detected by the first detecting means;

holding means for holding the output of the selecting means unchanged after the predetermined logic level is detected by the first detecting means, the holding means comprising an output terminal that serves as a clock selection output terminal of the clock selection circuit; and second detecting means for detecting the predetermined logic level contained in the output of the selecting means after the output of the selecting means is held by the holding means and releasing the holding means to allow the output of the selecting means to pass through to the output terminal of the clock selection circuit when the predetermined logic level contained in the output of the selecting means is detected.

2. The clock selection circuit of claim 1 wherein the first detecting means is a leading edge detector of the predetermined logic level when detecting the predetermined logic level contained in the output of the selecting means, and the second detecting means is a leading edge detector of the predetermined logic level when detecting the predetermined logic level contained in the output of the selecting means.

3. The clock selection circuit of claim 1 wherein the first detecting means comprises a flip-flop which is set when the predetermined logic level is detected by the first detecting means.

4. The clock selection circuit of claim 3 wherein the clock selection signal is stored into the clock selection register after the flip-flop of the first detecting means is set.

5. The clock selection circuit of claim 4 wherein the flip-flop of the first detecting means is reset when the clock selection signal is stored into the register of the selecting means.

6. The clock selection circuit of claim 3 wherein the holding means comprises a flip-flop for holding the output of the selecting means unchanged and the flip-flop of the holding means is set after the flip-flop of the first detecting means is set.

7. The clock selection circuit of claim 6 wherein the flip-flop of the holding means is reset after the predetermined logic level is detected by the second detecting means.

8. A clock selection circuit comprising:

selecting means for selectively outputting one of a first clock signal and a second clock signal, each clock signal comprising two different logic levels, the selecting means comprising a register for storing a clock selection signal and a selecting circuit for selecting as output one of the first clock signal or the second clock signal according to the clock selection signal stored in the register;

holding means coupled to the selecting means for selectively providing at an output terminal a predetermined logic level or the output of the selecting means, the output terminal of the holding means serving as a clock selection output terminal of the clock selection circuit;

first detecting means coupled to the selecting means for detecting the predetermined logic level contained in the output of the selecting means, the first detecting means causing the holding means to selectively output the predetermined logic level; and second detecting means coupled to the selecting means for detecting the predetermined logic level contained in the output of the selecting means when the holding means outputs the predetermined logic level and causing the holding means to selectively output the output of the selecting means;

wherein the selecting means selects the first clock signal or the second clock signal according to the clock selection signal after the predetermined logic level is detected by the first detecting means.

9. The clock selection circuit of claim 8 wherein the first detecting means is a leading edge detector of the predetermined logic level when detecting the predetermined logic level contained in the output of the selecting means, and the second detecting means is a leading edge detector of the predetermined logic level when detecting the predetermined logic level contained in the output of the selecting means.

10. The clock selection circuit of claim 8 wherein the first detecting means comprises a flip-flop which is set when the predetermined logic level is detected by the first detecting means.

11. The clock selection circuit of claim 10 wherein the clock selection signal is stored into the clock selection register after the flip-flop of the first detecting means is set.

12. The clock selection circuit of claim 11 wherein the flip-flop of the first detecting means is reset when the clock selection signal is stored into the register of the selecting means.

13. The clock selection circuit of claim 10 wherein the holding means comprises a flip-flop for holding the output of the selecting means unchanged, and the flip-flop of the holding means is set after the flip-flop of the first detecting means is set.

14. The clock selection circuit of claim 13 wherein the flip-flop of the holding means is reset after the predetermined logic level is detected by the second detecting means.

* * * * *